United States Patent [19]
Mazur et al.

[11] 3,920,531
[45] Nov. 18, 1975

[54] PREPARATION OF DERIVATIVES OF CHOLESTEROL

[76] Inventors: Yehuda Mazur, 14 Haknesset Hagdola St., Tel-Aviv; Avner Rotman, 8 Hagoren St., Rehovot, both of Israel

[22] Filed: Mar. 25, 1974

[21] Appl. No.: 454,394

[30] Foreign Application Priority Data
Apr. 1, 1973 Israel.................................. 41923

[52] U.S. Cl........................................ 204/157.1 R
[51] Int. Cl.$^2$............................................. B01J 1/10
[58] Field of Search................................... 204/158

[56] References Cited
UNITED STATES PATENTS
3,382,276 5/1968 Schenck et al.................. 204/158 R
3,476,779 11/1969 Vezina et al..................... 204/158 R

*Primary Examiner*—Howard S. Williams
*Attorney, Agent, or Firm*—Hubbell, Cohen, & Stiefel

[57] ABSTRACT

Process for the production of hydroxylated derivatives of cholesterol and 7-dehydrocholesterol which comprises subjecting a saturated unsubstituted or substituted derivative of cholestane, dissolved in a suitable solvent, in the presence of peracetic acid, to irradiation with ultraviolet radiation having a wavelength less than 350 m$\mu$, separating the reaction products, which if desired, are converted to other derivatives, and recovering the residue of the starting material. Novel derivatives are obtained and these are: 3$\beta$-acetoxy,25-hydroxy,5$\alpha$-cholestane; 3$\beta$-acetoxy,5$\alpha$,25-dihydroxy cholestane; 3$\beta$,5$\alpha$,25-trihydroxy cholestane; 3-keto,5$\alpha$,25-dihydroxy cholestane; 3-keto,25-hydroxy-$\Delta^4$-cholestane; 3-keto-25-hydroxy-$\Delta^{4,6}$-cholestadiene.

5 Claims, No Drawings

PREPARATION OF DERIVATIVES OF CHOLESTEROL

BACKGROUND OF THE INVENTION

A number of hydroxylated derivatives of cholecalciferol have been isolated as metabolites of cholecalciferol, and these have been found to be more potent than the parent compound, vitamin $D_3$. Thus, 25-hydroxy-, 21,25-dihydroxy- and 1,25-dihydroxy-cholecalciferol exhibit distinctive physiological activity and are of substantial importance in medicine.

According to the present invention there is provided a novel and simple process for the preparation of hydroxylated derivatives of cholesterol and of 7-dehydroxycholesterol, which are intermediates in the preparation of these and of other hydroxylated derivatives of cholecalciferol.

SUMMARY OF THE INVENTION

The present invention relates to the preparation of hydroxylated derivatives of cholesterol and 7-dehydrocholesterol and to the preparation of cholecalciferol and of derivatives of that compound.

The process of the present invention comprises subjecting a saturated unsubstituted or substituted cholestane derivative, dissolved in a suitable solvent, in the presence of peracetic acid, to irradiation with ultraviolet light having a wavelength less than 350 m$\mu$, resulting in the introduction of hydroxy groups in the tertiary position of the cholestane skeleton.

As the main product of the reaction there is obtained the 25-hydroxy derivative of the starting material, and its yield is of the order of about 10 percent. Thus 3$\beta$-acetoxy,5$\alpha$-cholestane (I) and 3$\beta$-acetoxy,5$\alpha$-hydroxy cholestane (II) resulted in the corresponding 25-hydroxy derivatives, (III) and (IV). In addition to these, further tertiary-hydroxylated derivatives were isolated.

Thus, for example, (II) gave in addition to (IV) also the 14$\beta$-OH (V); 17$\alpha$-OH (VI); 20$\alpha$-OH (VIII), 20$\beta$-OH (IX) derivatives, see Table.

The derivatives (IV) to (IX) were converted by a sequence of reaction steps to the corresponding hydroxylated 7-dehydrocholesterol derivatives. The sequence of reaction steps is illustrated with reference to the reaction of (IV): Compound (IV) was hydrolyzed with methanolic potassium hydroxide to 3$\beta$,5$\alpha$,25-cholestane-trio (X); this was oxidized by means of chromic acid to the corresponding 3-keto-derivative (XI). The latter was dehydrated with acid to the corresponding $\Delta^4$-3-keto-derivative (XII). Compound (XII) was converted by heating with chloranil to the corresponding 3-keto-4,6-diene (XIII) which was acetylated by means of acetic anhydride and then reduced with sodium borohydride to the desired 25-hydroxy-7-dehydrocholesterol (XIV). The conversion of (XII) to (XIV) is effected by conventional means, similar to those described with reference to the preparation of 7-dehydrocholesterol derivatives by Pelc et al., J. Chem. Soc. (C) 3415 (1971).

The $\Delta^4$-3-keto-cholestane derivative (XII) was converted to its enol-acetate derivative (XV) which was reduced with sodium borohydride to the 25-hydroxy-cholesterol. In the same way the related $\Delta^4$-3-ketones derived from the compound V to IX gave the respective hydroxy-cholesterol derivatives.

DESCRIPTION OF THE PREFERRED EMBODIMENT

Example 1

A solution of 15 g of 3$\beta$-acetoxy-5$\alpha$-cholestane in 250 cc of ethyl acetate was treated with 30 cc of peracteic acid (40 percent) in acetic acid and was irradiated with u.v. light of about 300 m$\mu$. wavelength for 24 hours. The resulting reaction mixture was washed consecutively with an aqueous solution of sodium bisulfite, sodium bicarbonate and water and the solvents were evaporated in vacuo to dryness. The residue was chromatographed on a column of silica gel to give 1.5 g of the novel 3$\beta$-acetoxy-25-hydroxy-5$\alpha$-cholestane, m.p. 180°–181°C and 1.2 g of the known 3$\beta$-acetoxy-5$\alpha$-hydroxy-cholestane, m.p. 125°–126°C.

Example 2

A solution of 50 g 3$\beta$-acetoxy-5-$\alpha$-hydroxy cholestane in 25 ml. ethyl acetate was treated with 100 ml. of peracetic acid (70 percent) in acetic acid and was irradiated with u.v. light of about 300 m$\mu$. wavelength for 12 hours. The resulting reaction mixture was washed with a solution of aqueous sodium bisulfite, sodium bicarbonate and then with water. After evaporation of the solvent in vacuo the residue was chromotographed on a column of silica gel to give 10g of the new 3$\beta$-acetoxy-5$\alpha$,25-dihydroxy cholestane (IV) which was recrystallised from methanol, m.p. 216°–217°C and a mixture consisting of 3$\beta$-acetoxy-5$\alpha$,14$\beta$-dihydroxy-cholestane (V), 3$\beta$-acetoxy,5$\alpha$,17$\alpha$-dihydroxy-cholestane (VI), 3$\beta$-acetoxy,5$\alpha$,17$\beta$-dihydroxy-cholestane (VII), 3$\beta$-acetoxy-5$\alpha$,20$\alpha$-dihydroxy cholestane (VIII), 3$\beta$-acetoxy,5$\alpha$, 20$\beta$-dihydroxy-cholestane (IX).

Example 3

A solution of 3$\beta$-acetoxy-5$\alpha$,25 dihydroxy-cholestane in 40 cc methanol and 10 cc dioxane was treated with 6 cc of 10 percent solution of sodium hydroxide and refluxed for 3 hours.

The reaction mixture was neutralized with a solution of 5 percent aqueous hydrochloric acid, evaporated in vacuo and the residue recrystallized from ether to give 850 mg of the 3$\beta$,5$\alpha$,25-trihydroxy-cholestane, m.p. 225°–227°C.

Example 4

A solution of 750 mg of the 3$\beta$,5$\alpha$,25-trihydroxy-cholestane in 300 ml of acetone was treated dropwise with 10cc of Jones reagent. The reaction mixture was treated with 10 ml of methanol, left for 15 minutes at room temperature and concentrated in vacuum. The residue was recrystallised from benzene to give 570 mg of 3-keto-5$\alpha$,25-dihydroxy-cholestane, m.p. 165°–167°C.

Example 5

A solution of 950 mg of 3-keto-5$\alpha$,25-dihydroxy-cholestane in 200 ml of benzene was refluxed for 2.5 hours in the presence of 200 mg of p-toluene sulfonic acid. The compound was isolated with ether and chromatographed on silica gel to give 600 mg of the known 3-keto-25-hydroxy-$\Delta^4$-cholestane, m.p. 153°–155°C.

Example 6

A solution of 50 mg 3-keto-25-hydroxy-$\Delta^4$-cholestane in 100 ml of t-butanol was refluxed for 44 hours in the presence of 120 mg of chloranil. The reaction mixture was filtered, the filtrate was evaporated to dryness and the residue chromatographed on silica gel to give 35 mg of 3-keto-25-hydroxy-Δ⁴,⁶-cholestadiene, m.p. 175°–177°C.

We claim:
1. A process for producing hydroxylated derivatives of cholesterol and 7-dehydrocholesterol, which comprises subjecting a saturated unsubstituted or substituted derivative of cholestane, dissolved in a suitable

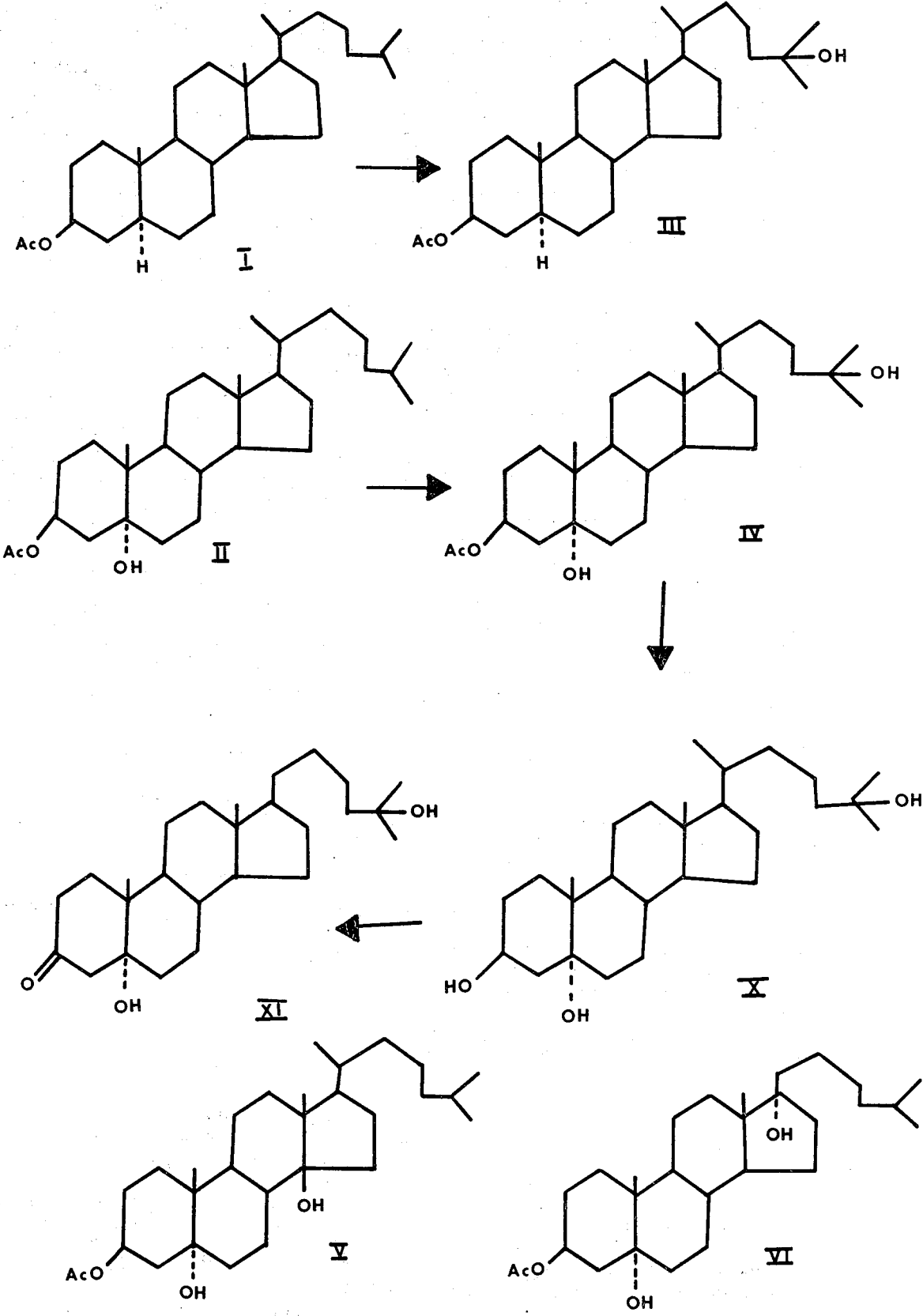

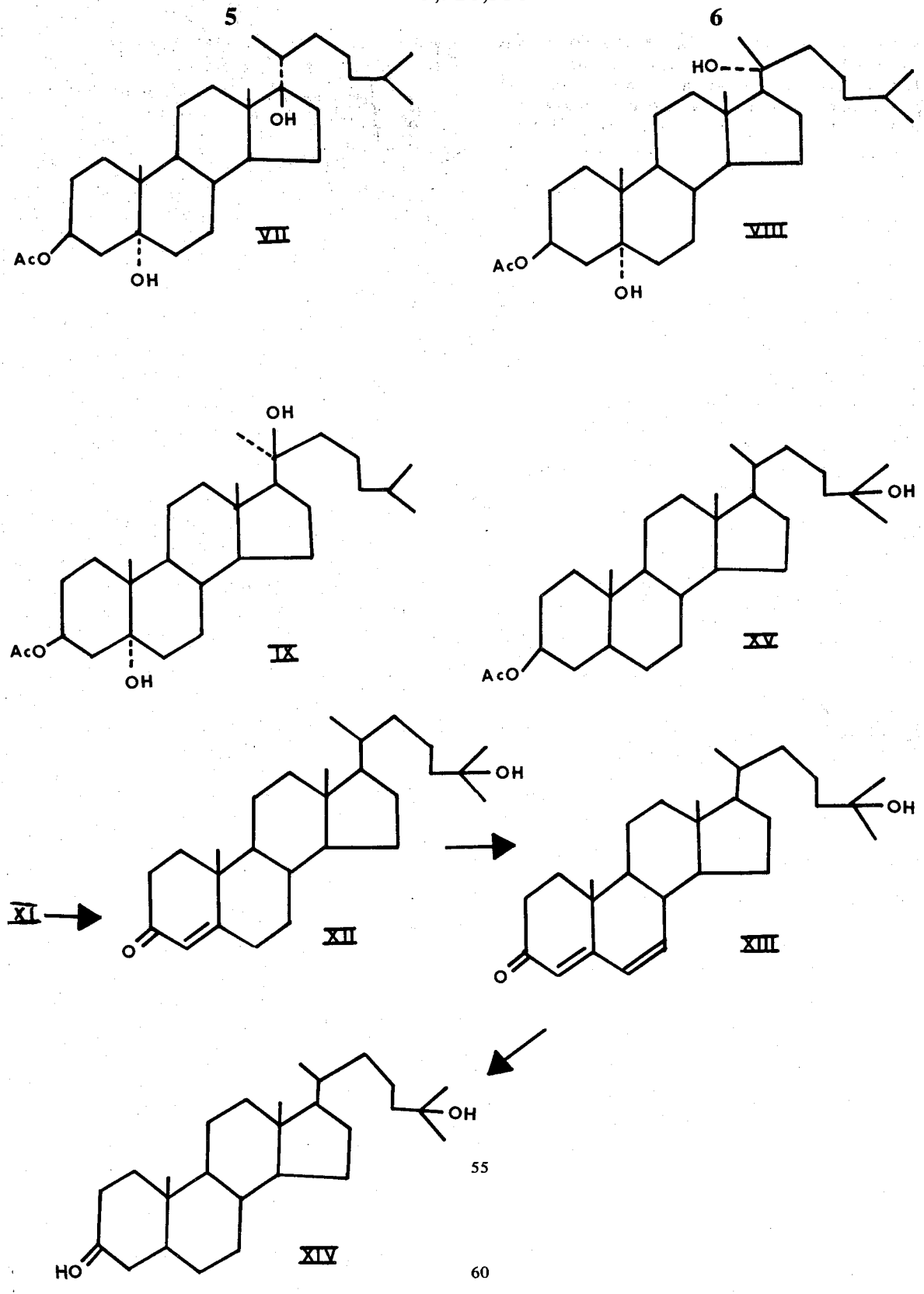

solvent, in the presence of peracetic acid, to irradiation with ultra-violet light having a wavelength of less than 350 mμ, separating the products of the reaction and recovering the residue of the starting material.

2. A process as claimed in claim 1, wherein the starting material is 3β-acetoxy,5α-cholestane and one of the products is the corresponding 25-hydroxy derivative.

3. A process as claimed in claim 2, wherein a further product is 3β-acetoxy,5α-hydroxy cholestane.

4. A process as claimed in claim 1, wherein the starting compound is 3β-acetoxy,5α-hydroxy cholestane and the product comprises 3β-acetoxy,5α-25-hydroxy cholestane.

5. A process as claimed in claim 4, wherein there are also obtained 3β-acetoxy,5α,14β-dihydroxy-cholestane; 3β-acetoxy, 5α,17α-dihydroxy cholestane; 3β-acetoxy-5α,17β-dihydroxy cholestane; 3β-acetoxy-5α,20α-dihydroxy cholestane and 3β-acetoxy, 5α,20β-dihydroxy cholestane.

* * * * *